Jan. 6, 1925.
J. GABLE
1,522,364
ANTISKID CHAIN
Original Filed April 14, 1923
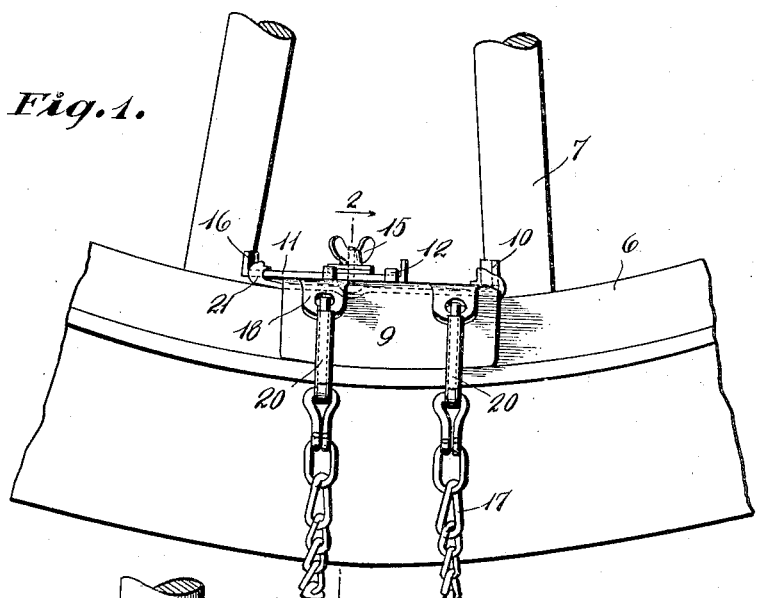
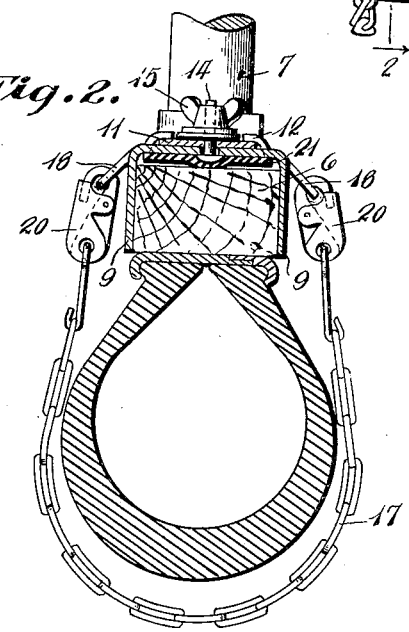
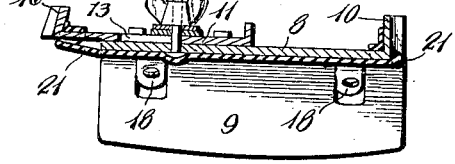
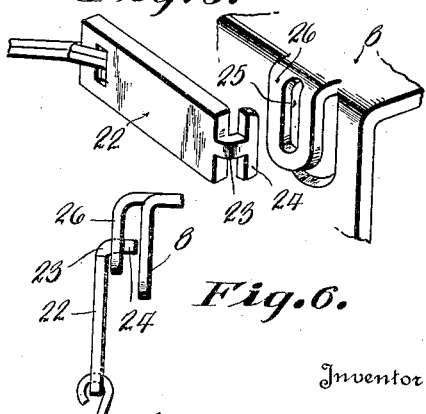
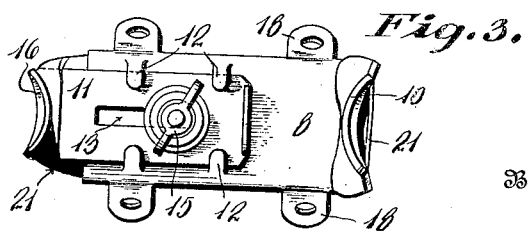
Inventor
Joseph Gable
By John A. Bomnhardt
Attorney Patented Jan. 6, 1925.

1,522,364

UNITED STATES PATENT OFFICE.

JOSEPH GABLE, OF CLEVELAND, OHIO.

ANTISKID CHAIN.

Application filed April 14, 1923, Serial No. 632,034. Renewed November 3, 1924.

*To all whom it may concern:*

Be it known that I, JOSEPH GABLE, a citizen of the United States, residing at Cleveland, in the county of Cuyahoga and State of Ohio, have invented certain new and useful Improvements in Antiskid Chains, of which the following is a specification.

This invention relates to anti-skid chains for automobile wheels, or the like, and has for its object to provide anti-skid chains which can be readily applied to a wheel without the difficulty usually experienced in placing a long set of chains around a tire. It is intended that a number of devices herein described shall be carried, and they can be quickly applied around the rim of a wheel at any place desired, the attaching device being so constructed that the chains will not slip, nor will they injure the rim and spokes of the wheel.

The device is illustrated in the accompanying drawings in which Fig. 1 is a side elevation of a part of a wheel with the device applied between two of the spokes. Fig. 2 is a section on the line 2—2 of Fig. 1. Fig. 3 is a plan of the clamp for holding the chains. Fig. 4 is a longitudinal section thereof. Figs. 5 and 6 are details of a modification.

In the drawings, 6 indicates the felly of a wheel and 7 the spokes. The clamp or holder to which the chains are attached is set on the felly between the spokes, and it consists of a channeled member 8 with flanges 9 which fit against the sides of the felly and embrace the felly therebetween. At one end, the plate 8 has an upturned lip 10 set at an angle to fit against one of the spokes, and slightly concave to agree with the curvature of the spoke. The other member of the clamp comprises a sliding plate 11 the edges of which are confined under tongues 12 struck up at opposite sides of the plate 8, and the plate 11 is slotted as at 13 to receive a bolt 14 set in the plate 8, with a thumb nut 15 on the bolt. The outer end of the plate 11 is also struck up and curved as indicated at 16 to fit against the adjacent spoke.

A pair, or more or less, of chains 17 are attached to perforated ears 18 struck up from the flanges 9 at opposite sides of the plate 8, the chains being attached by any suitable form of hooks 20.

The plate 8 is provided with rubber lining 21 on the inner side, to prevent marring the felly.

In the modified forms shown in Figs 5 and 6, instead of attaching the chains to hooks 20 they are connected by links 22 terminating in necks 23 and a locking head 24 which may be inserted in a slot 25 in the ear 26 on the plate 8, and then turned as shown in Fig. 6 to engage cross-wise with the slot. This provides a quick and easy means of attaching the chains.

In the use of the device, the member 8 is placed on the felly with its flanged end against one of the spokes. The member 11 is then slid outwardly until its flanged end contacts with the next spoke, and the thumb nut 15 is then tightened. The angularity of the spoke holds the attaching device in position so that it cannot move. The chains may then be connected around the tire, and will act to prevent skidding on slippery roads and to give traction on muddy roads.

I claim:

An anti-skidding attachment comprising a channel plate adapted to fit on a felly, with its flanges embracing the felly, and having an upturned lip at one end adapted to fit against one of the spokes of the wheel, a sliding plate mounted on said plate and having a lip at one end adapted to be advanced against another spoke, means to clamp the sliding plate in position, and a chain connected to opposite sides of the channel plate and adapted to extend around a tire, the channel plate having ears struck up therefrom to which the chain is connected.

In testimony whereof, I affix my signature in presence of two witnesses.

JOSEPH GABLE.

Witnesses:
 JOHN A. BOMMHARDT,
 BESSIE F. POLLAK.